(12) United States Patent
Finkel et al.

(10) Patent No.: US 6,671,226 B1
(45) Date of Patent: Dec. 30, 2003

(54) ULTRASONIC PATH GUIDANCE FOR VISUALLY IMPAIRED

(75) Inventors: Joel L. Finkel, Phoenix, AZ (US); Jiping He, Tempe, AZ (US)

(73) Assignee: Arizona Board of Regents, Tempe, AZ (US)

(*) Notice: Subject to any disclaimer, the term of this patent is extended or adjusted under 35 U.S.C. 154(b) by 0 days.

(21) Appl. No.: 10/159,352

(22) Filed: May 31, 2002

Related U.S. Application Data
(60) Provisional application No. 60/295,440, filed on Jun. 1, 2001.

(51) Int. Cl.[7] .................................................. G01S 15/00
(52) U.S. Cl. ...................................................... 367/116
(58) Field of Search .......................... 367/116, 99, 101; 342/24

(56) References Cited

U.S. PATENT DOCUMENTS

| | | | |
|---|---|---|---|
| 3,321,737 A | 5/1967 | Russell | 367/116 |
| 3,337,839 A | 8/1967 | Nelkin | 367/116 |
| 3,842,397 A | 10/1974 | Sindle | 367/111 |
| 3,987,403 A | 10/1976 | Smith | 367/102 |
| 4,008,456 A | 2/1977 | Ewart | 340/407.1 |
| 4,280,204 A | 7/1981 | Elchinger | 367/116 |
| 4,459,689 A | 7/1984 | Biber | 367/107 |
| 4,636,996 A | 1/1987 | Tsuji | 367/107 |
| 4,658,385 A | 4/1987 | Tsuji | 367/105 |
| 4,907,136 A | 3/1990 | Jorgensen | 367/116 |
| 5,307,137 A | 4/1994 | Jones et al. | 36/4.01 |
| 5,687,136 A * | 11/1997 | Borenstein | 367/116 |
| 5,807,111 A * | 9/1998 | Schrader | 367/116 |
| 5,982,286 A | 11/1999 | Vanmoor | 367/118 |
| 6,011,754 A | 1/2000 | Burgess et al. | 367/116 |

OTHER PUBLICATIONS

Personal Electronic Mobility Devices.
New Scientist, "Sonic aids for the blind–do they work?", Peter Marsh, Jul. 13, 1978, pp. 114–117.
IEEE Spectrum, "Innovations—Seeing–eye cane steers the blind", Linda Geippert, Oct., 1997, p. 17.
IEEE Transactions on Biomedical Engineering, "The Navbelt—A Computerized Travel Aid for the Blind Based on Mobile Robotics Technology", S.Shoval, et al., vol. 45, No. 11, pp. 1376–1386, Nov., 1998.

* cited by examiner

Primary Examiner—Daniel T. Pihulic
(74) Attorney, Agent, or Firm—Gallagher & Kennedy, P.A.; Thomas D. MacBlain (57) ABSTRACT

An ultrasonic path guidance system and method for the visually impaired uses an array of ultrasound transmitters that are directional and aimed at distinct locations forward of the user. The transmitters are positioned on the torso of the individual user and one or more receivers detect echoes from obstacles upon which the transmitted ultrasound sound impinges. Audible tone is generated each time an echo is received. The tone's frequency is dependent on which transmitter transmitted the original ultrasound pulse that resulted in the detected echo. This gives an easy to understand indication of the location of detected obstacles. The elapsed time from emission of an ultrasound pulse to reception of its echo is used to arrive at the distance to the obstacle.

34 Claims, 9 Drawing Sheets

ULTRASONIC PATH GUIDANCE FOR VISUALLY IMPAIRED

CROSS REFERENCE TO RELATED APPLICATIONS

This application claims priority from the provisional patent application Ser. No. 60/295,440, filed Jun. 1, 2001 in the name of Joel L. Finkel and Jiping He entitled "Ultrasonic Path Guidance for Visually Impaired," incorporated herein by reference.

STATEMENT OF GOVERNMENT FUNDING

Financial assistance for this project was provided by the U.S. Government through the National Science Foundation under Grant Number BES 9631744-0003. Therefore the United States Government may own certain rights to this invention.

FIELD OF THE INVENTION

This invention relates to a system and method for providing visually impaired individuals and more particularly to a system and method of emitting ultrasound pulses to detect obstacles in the path of the visually impaired.

BACKGROUND OF THE INVENTION

Based on census data from the 1990 census, the mean monthly earnings for those without disabilities has been reported as $1,962. For the severe and non-severe "functional limitation in seeing" group, the mean monthly earnings was reported as $1,573. For the severe "functional limitation in seeing" group only, the mean monthly earning was $1,238. When these numbers are calculated for a mean yearly income, the no disability work force made $23,544, the severe and non-severe limitation in seeing group made $18,876, and the severe limitations only group made $14,856. The difference in mean earnings is alarming. The visually impaired were not only unable to compete for jobs, they were unable to compete for jobs with high earnings.

Any device or technique that enables the visually impaired to move more easily in their surroundings would be of benefit. The most familiar aids are, of course, the cane and the guide dog. The cane does not alert the visually impaired to obstacles they are approaching that are beyond the reach of the cane, nor to those located above ground level, like an overhanging branch, for example. A guide dog may stop the individual from proceeding, but does not provide feedback as to obstacles in the path of the individual. In any event, neither the cane nor the guide dog is as unobtrusive as may sometimes be desired. Neither the cane nor the guide dog permits the visually impaired to navigate with both hands free.

A U.S. patent to Nelkin, Pat. No. 3,337,839 describes a guidance apparatus that uses a plurality of ultrasound transducers in an array worn by a visually impaired person. The transducers are directional and are pointed into separate locations in front of the individual. Echoes of the ultrasound pulses from the transducers are identified on the basis of time of receipt and are used to stimulate an array of vibratory devices also worn by the user. The vibratory devices mimic the locations of the ultrasonic transducers to indicate where, in front of the user, an obstacle may be encountered.

Elchinger U.S. Pat. No. 4,280,204 dated Jul. 21, 1981 describes a modified mobility cane for the visually impaired. It is described as capable of chest and/or face height detection at multiple distances. The transducer is ultrasonic and is mounted on the cane. The output is auditory, sent by wire to an earphone. The design is advantageous to the extent that it allows the user to have one free hand. It also is described as having a short range and a long range option for detecting chest height obstacles or face height obstacles. The zone of detection is described as being adjustable. The design is disadvantageous because the output is through an earphone, which could be uncomfortable and impede the visually impaired user's ability to hear. The user does not have both hands free. The single transducer does not appear to provide sufficient information as to location of an obstacle being approached.

U.S. Pat. No. 4,459,689 of Biber dated Jul. 10, 1984 is for a multiple zone object detection system. This system uses ultrasonic sensors to detect multiple environmental zones. Like the Nelkin patent, Biber distinguishes between each zone on the basis of the time of receipt of echoes of the serially transmitted ultrasound signals. The Biber patent does not refer to guidance for the visually impaired.

Two U.S. Pat. Nos. 4,658,385 and 4,636,996, both to Tsuji, describe an ultrasonic obstacle detection system and methodology using a CPU for mobile robot control. The system uses three transmitters, two receivers, a CPU and data ROMs. It calculates the location of an obstacle with spatial coordinates and the time difference between wave transmission and reception. The timing of echoes received at the two receivers is used to specify location coordinates of obstacles.

Vanmoor U.S. Pat. No. 5,982,286, issued Nov. 9, 1999, is for another electronic travel aid for the visually impaired. The frame of a pair of eyeglasses houses the sensors, circuitry and power source. The output is auditory. A benefit is that the system must always be worn in the same way, insuring proper sensor placement. As the wearer moves closer to an obstacle a beeping output becomes louder and more frequent. The patent does not describe any output indication of location other than distance from the wearer. The audible outputs are by the individual's ears, which can interfere with the user's hearing.

In 1970, Geoff Mowatt, created a sensor that, when it detected an obstacle, a vibratory output would stimulate its user's hand. As the distance to an obstacle decreased, the frequency of vibration increased. This device had an adjustable detection range for short distance (3') and long distance (12'). The Mowatt sensor is believed to have been commercially the most successful electronic travel aid (ETA) thus far. It had roughly 30 years of commercial availability.

In 1971, the United States Veterans Administration evaluated the C-4 Laser Cane to be used by blind veterans. One of the veterans in the evaluation program wrote, "it was designed to detect obstacles hanging overhead or protruding from the sides at head level within the path of travel; to detect objects in front and between the left and right arc; and to detect such downdrops as deep curbs, stairways, and from platforms." The advantage of the Laser Cane is that is was a primary aid that could detect all obstacles in front of its user. This was also one of the major disadvantages. A complex electronic device, such as the Laser Cane, consumes power and runs out of power. The user may end up stranded. Another disadvantage is the extensive amount of training required to be proficient with the Laser Cane. The veteran who used the device went through five weeks of intense training. Few people with full time employment can afford to take such time away from their jobs. A further disadvantage is cost. Complex devices like the Laser Cane are expensive to manufacture and are built with expensive state-of-the-art sensing equipment. Few visually impaired people are in the position to take the time and spend the money to use the Laser Cane.

The newest generation of electronic travel aids (ETAs) is far more sophisticated than previous generations, thanks to the microprocessor. A research team at the University of Michigan developed an ETA called the "GuideCane." It is an enhanced seeing-eye cane that uses an array of ultrasonic sensors to detect obstacles in its user's path. The sensors and processor circuitry are at the front end of the cane, attached to two large wheels. The user chooses the direction of travel by using a joystick attached to the cane's handle. This propels the cane and user in the desired direction. When an obstacle is detected, the GuideCane measures the distance and orientation to the obstacle and steers the user around. Unfortunately, the design of the GuideCane system warrants some questions about user safety. It is not clear how well the GuideCane handles floor obstacles, such as curbs and steps. There is a strong possibility of injury to the user or other people when navigating through crowded places. The system guides the user past detected obstacles, but if someone or something moves between the user and the sensory equipment (i.e., a closing door or a hurried pedestrian), the user or intervening person could sustain injuries. It is not clear whether or how chest and face height obstacles are detected. Once again cost is believed to be a drawback.

Another new ETA, the Navbelt, uses a belt of ultrasonic sensors to create a complete environmental map of its wearer's surrounding environment. The technology is based on real-time signal processing optimized to solve for obstacle avoidance. Eventually, it could be combined with global positioning to give its wearer the capability of navigation through unknown environments. Cost is again a concern.

There remains a need for a navigational aid for the visually impaired that quickly and accurately identifies the location of obstacles in the path of the user, that gives its user a useful range of detection that is easy to understand and so requires very little training, that does not interfere with the use of the user's hands, and that is relatively inexpensive to manufacture, durable, small and light, and has long battery life.

BRIEF SUMMARY

In accordance with a preferred embodiment of the present invention, a system and method of assisting a vision impaired person to recognize obstacles includes the direction of a first ultrasound pulse in a first direction from the person, detection of an echo of the first ultrasound pulse to the person when an obstacle is located in that first direction and direction of at least a second ultrasound pulse in a second direction away from the person and detection of an echo of the second ultrasound pulse when an obstacle is located in the second direction. The system then generates, in dependence upon whether an echo of the first tone or the second tone is received, either a first tone of a first discernable, non-visible characteristic (such as specific frequency) or a second tone of at least a second discernable, non-visible characteristic (such as a second, different frequency). Preferably the tones thus generated are audible tones at the first and second frequencies. Preferably, too, the first and second ultrasound pulses are just two of a series of four or more pulses from an array of ultrasound transmitters. Each pulse, if echoed to a receiver or receivers, causes the generation of a distinctive audible tone.

In one preferred embodiment the ultrasound pulses are themselves distinguishable. The first has a first detectable characteristic, the second has a second detectable characteristic and so on, such that echoes of the tones can be recognized based on those detectable characteristics of the first and second pulses.

In another preferred embodiment the time of receipt of an ultrasound pulse is the basis on which it is determined that it is the echo of a particular ultrasound pulse. The generation of audible tones' first and second frequencies can be accomplished by providing a plurality of signal generators coupled to a speaker, each of the signal generators having one of the first and second frequencies and being activated upon receipt of the first or the second ultrasound pulses. Alternatively, a variable frequency signal generator may be controlled on the basis of which ultrasound pulse is identified as having been echoes to the vision impaired user.

In the case where the ultrasound pulses have first and second detectable characteristics, these may be ultrasound pulses of first and second (or more) frequencies. These first and second frequencies need not be the ultrasonic frequencies, but a lower frequency pulsation or modulation of the pulse of ultrasound. A series of ultrasound transducers may be serially and repeatedly excited to produce ultrasound pulses spaced apart temporally and emanating in different directions from the person so that the time of receipt of any echo will be indicative of the location of an obstacle in the path of the individual. The sampling frequency is important for detecting head and chest height obstacles and for detection at a useful range, while also making the system easier to understand. Also, when the sampling rate increases, more power is consumed. This means that the sampling frequency is also related to long battery life.

Preferably the audible signals or tones increase in rapidity of repetition as the distance to the obstacle decreases. That distance can be determined from the elapsed time from the emission of the ultrasound pulse to the receipt of its echo.

In one embodiment a plurality of ultrasound transmitters are located on the person of the sight-impaired individual. Each differs at least slightly in direction of emission. Each transmitter is paired with a receiver located to receive echoes from objects located in the direction of its associated transmitters' emission. In that case, each ultrasound receiver activates production of a recognizable output. Based on a discernable characteristic of that output the user can recognize the direction from which an echo is received from an obstacle. Again, a series of oscillators operating at different frequencies may be the source of the differentiating characteristics of the audible tones that identify the direction in which an obstacle lies or a variable oscillator may be employed.

The system of one embodiment includes a timer or clock that controls the timing of a source of exciting electrical signal driving the ultrasound transmitters. The timer or clock is also operatively coupled to time the receipt of an echo at the ultrasound receiver and tone generator so that emission of an ultrasound pulse can be precisely timed and its receipt detected within a time period to determine which pulse transmitter has been echoed and consequently the direction from which an echo has been received.

In a specific preferred embodiment four piezoelectric ultrasound transmitters are employed. At least one piezoelectric ultrasound receiver receives echoes from the four transmitters. An excitation electrical signal generator has its output divided among the transmitters by an analog multiplexer such that the transmitters are pulsed one after another at 29 Hz. At least one tone generator operates to produce tones at 10 kHz, 5 kHz, 2500 Hz and 1250 Hz for application to a speaker. The first of the ultrasound transmitters is aimed to transmit ultrasound pulses at objects generally corresponding to the height of and in front of the user's head. The second of the transmitters is aimed to transmit ultrasound pulses at objects generally corresponding in height and in front of a left location on the user's torso. The third transmitter is aimed to transmit ultrasound pulses at objects generally corresponding in height and in front of a right location on the user's torso. And the fourth of the transmitters is aimed to transmit ultrasound pulses at objects generally corresponding in height and in front of a centered location on the user's torso. The at least one speaker-exciting tone generator produces the 10 kHz, 5 kHz, 2500 Hz or 1250 Hz tones depending upon which of the four transmitters produces a detected echo.

The above and further objects and advantages of the invention will be better understood with respect to the following detailed description of a preferred embodiment taken in combination with the accompanying drawings.

DETAILED DESCRIPTION

Figure 1:
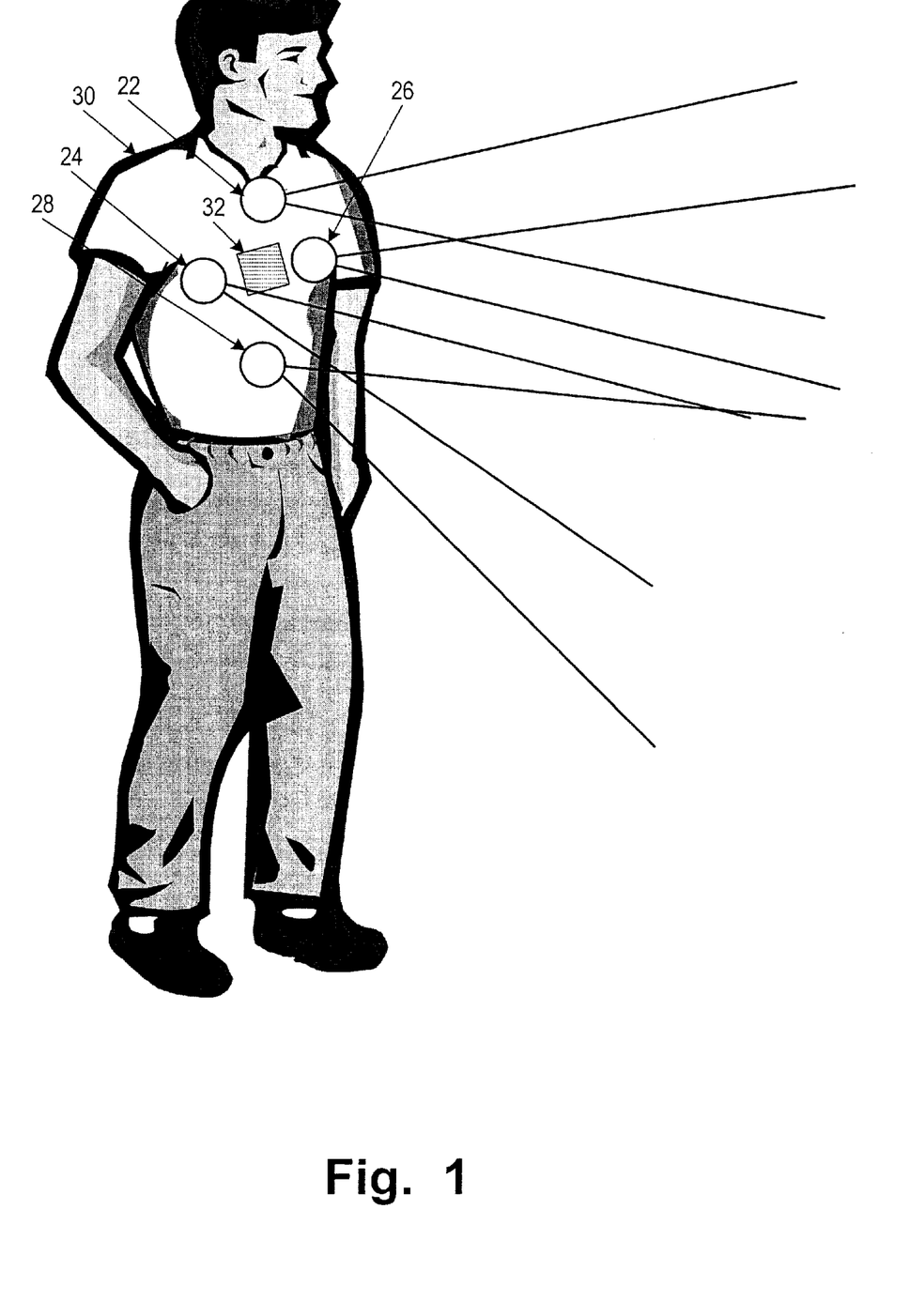
FIG. 1 is a schematic illustration of ultrasound path guidance system for the visually impaired as placed on a sight-impaired user.

As shown in FIG. 1, a visually impaired individual has a series of four ultrasound transmitters 22, 24, 26 and 28 on the front of his body. Here, for easy visualization, these are shown mounted on a garment 30 designed for that purpose. They may be supported by a harness, they may be enclosed in a suitable enclosure which is supported on the individual's body or they may be supported by any other desired means of mounting. An ultrasound receiver unit 32 is located to receive echoes of ultrasound pulses emitted by the transmitters 22, 24, 26 and 28. Each of these transmitters is directional and is aimed in a slightly different direction. For example, the transmitter 22 may be aimed to direct ultrasound pulses to obstacles located generally at the level of the head of an individual and at a distance of, say, three to five feet from the individual. The transmitter 24 can be aimed to direct pulses directly in front of a right portion of the individual's torso while the transmitter 26 may be aimed to direct pulses to a location in front of a left portion of the individual's torso. The transmitter 28 may be aimed, for example, to direct its pulses to a location in front of a central portion of the torso or slightly lower.

The ultrasound receiver unit 32 includes not just the piezoelectric transducer that converts the ultrasound echo to an electrical pulse, but control electronics including a microcontroller, program containing memory, tone generators or oscillators and an output speaker at the face of the unit 32. These are described in greater detail below.

Figure 2:
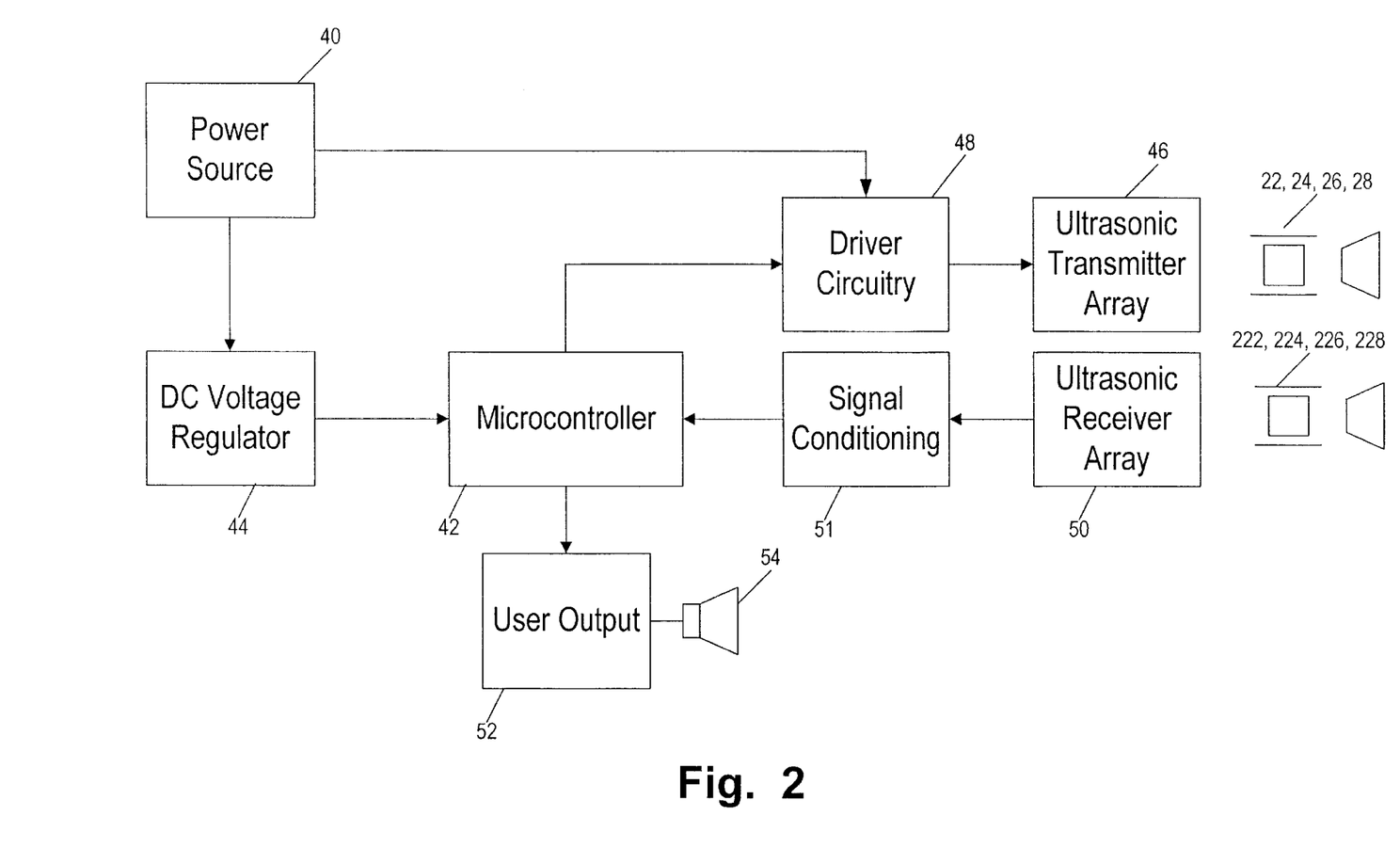
FIG. 2 is a functional block diagram of a system for ultrasound pulse emission and reception used in detecting obstacles in the path of the visually impaired.

FIG. 2 shows schematically a preferred embodiment of a system like that illustrated in FIG. 1. The system includes a power source 40 supplying power to a DC voltage regulator 44 that delivers 3.3 to 5 volts DC to a microcontroller 42. The microcontroller 42 may, for example, be a PIC16F84A manufactured by Micro Chip. It contains an internal RC oscillator but can be configured to use an external crystal oscillator for timing purposes where, as here, precise timing is required. With this microcontroller 42 the internal clock frequency is approximately ¼ of the frequency of the external crystal oscillator providing the source frequency. An array 46 of ultrasonic transmitters operates at 40 kHz in this preferred embodiment. These transmitters are the piezoelectric transducers such as those shown at 22, 24, 26 and 28 in FIG. 1. Microcontroller 42 controls driver circuitry 48 that delivers the 40 kHz signal to the ultrasonic transmitters of the array 46. The 40 kHz wave that excites the ultrasonic transmitters has a period of 25 $\mu$s, made up of a positive 12.5 $\mu$s portion and a negative 12.5 $\mu$s portion. The external crystal source must create an internal signal having a half-cycle period of 0.5 $\mu$s or less to achieve an exact 40 kHz signal. For this, an 8 Mhz crystal is the minimum requirement. It may be found that signals of 41.7 or 38.5 kHz can fire the transmitters as effectively. In that case a crystal capable of generating 12 microseconds or 14 microsecond half-cycle portions would be adequate.

The power supply 40 is a 9 or 12 volt DC power supply. The DC voltage regulator 44 may be an M7805 or equivalent positive DC voltage regulator delivering 5.0 volts DC to the microcontroller. Either 9 or 12 volts DC is needed to provide adequately strong excitation to the ultrasound transmitting transducers of the array 46. The driver circuitry 48 takes transmitter-firing signals from the microcontroller and conditions them (amplifies and shapes them) to increase the strength of the transmitted sound waves. The amplification is amplification to the system power supply level (i.e. 9 or 12 volts DC) and two 180 degree out-of-phase signals are created to excite the piezoelectric transducers at the transmitted array from both sides. The opposite-phase signals maximize the amount of mechanical deformation in the crystal elements of the transducers, creating strong ultrasound waves. Receiver circuitry in an ultrasonic receiver array 50 requires signal conditioning including amplification. The logic high level for the microcontroller is approximately 3.6 volts DC and the incoming signal can be in the milllivolt range. This, then, requires an amplification gain of 1,000 or more. Filtering may be required to remove noise from the signal, as well. The ultrasonic receivers are inherently sensitive to 40 kHz signals, but other noise can be present from other circuit components and environmental sources. Signal conditioning circuitry for these purposes is designated generally 51 in FIG. 2. The "user output" 52 is a tone generator connected with the microcontroller 42. A speaker 54 is driven by the tone generator of the user output 52 to produce audible signals. These vary in pitch and repetition rate to identify direction and distance to obstacles. In other words, when an obstacle closes distance with the system, the frequency of the "beeps" increases until they eventually turn into a single continuous tone. The pitch or frequency of the beeps varies in accordance with which ultrasonic transmitter pulse has been echoed to produce the output. The output may also be applied to vibratory motors as a more discreet form of system output using the same concepts for identifying direction and distance. Direction would be indicated by sending the output signal to a different motor of a differently located vibrational unit and distance would be indicated by the frequency of vibrations or frequency of pulses of vibrations.

Figure 3:
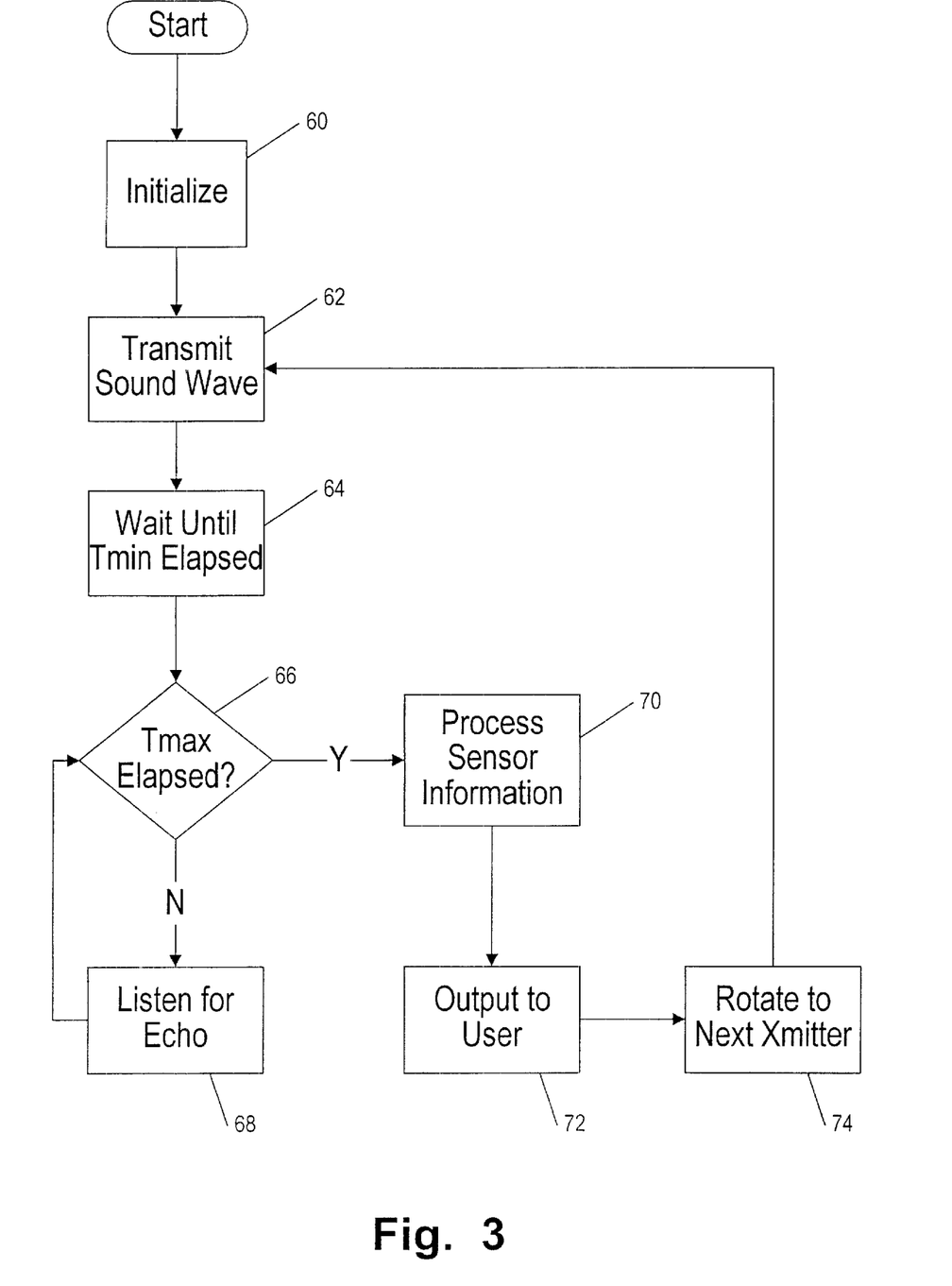
FIG. 3 is a flow chart of programming for a microcontroller used to operate a system like that illustrated in FIG. 2.

The microcontroller 42 provides the timing and obstacle detection method of the system. Both functions are software-based. Programming is stored in the programmable ROM area of the microcontroller. The program controlling the system is described using the flow chart of FIG. 3. The flow chart is macroscopic and does not include routine internal details. It illustrates an infinite loop that is only interrupted by system failure such as power loss or switching off intentionally. The system uses rotating transmitters. That is, referring to FIG. 1, the transmitters 22, 24, 26 and 28 are serially activated continually to produce temporally spaced ultrasound pulses. The rotating transmitter concept conserves power by triggering only a single transmitter at a time. Also, it reduces the risk of receiving false echoes from other transmitters and outside sources. The number of transmitters used is the limiting factor. The system sampling frequency, defined as the number of times that the sensor firing and detection cycle occurs per second, is divided among the transmitters. For example, if the system had a maximum sampling frequency of 100 Hz and contained four transmitters, each would have a sampling frequency of 25 Hz. In other words each would emit an ultrasound pulse 25 times per second. As illustrated in FIG. 3, upon "turn-on" of the system, as indicated at 60, a first of the transmitters transmits an ultrasound pulse, at 62. The system then waits a time Tmin at 64. At decision block 66 it is determined whether a time Tmax has elapsed. If not, at 68, the system continues to listen for an echo, but if Tmax has elapsed the retrieved information is processed at 70 and output to the user at 72 via the user output 52 and output speaker 54 of FIG. 2. The function is rotated, at 74, to the next transmitter in the array 46 of FIG. 2.

Figure 4:
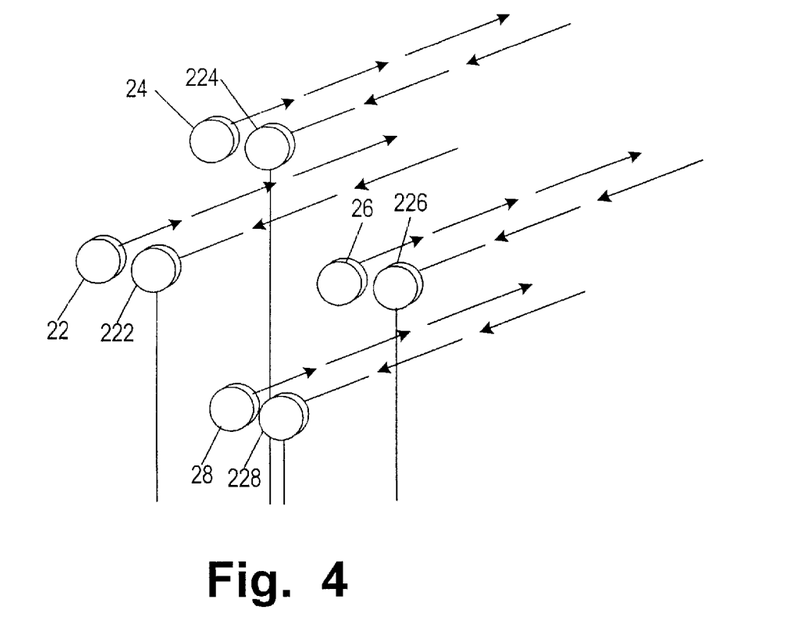
FIG. 4 is a schematic illustration of an array of transmitters and receivers for transmitting ultrasound pulses and receiving echoes of the pulses reflected from obstacles.
Figure 5:
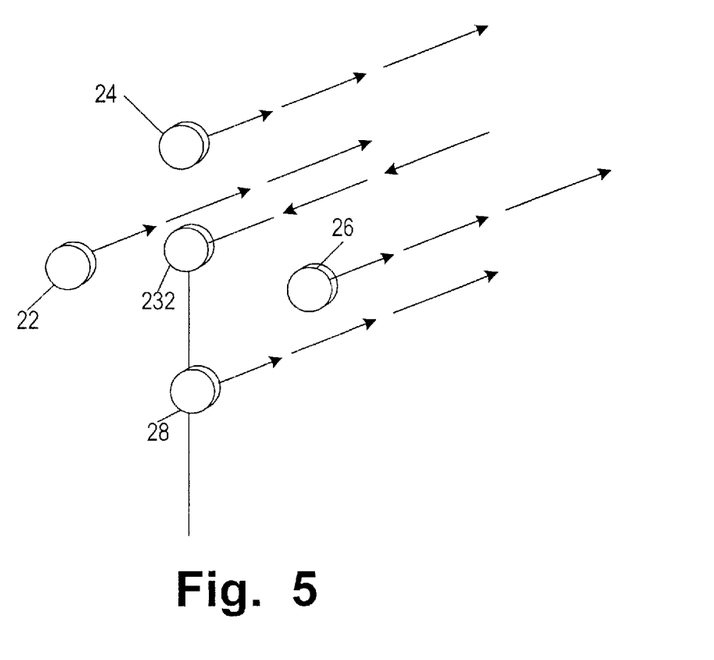
FIG. 5 is a schematic illustration of a further array of ultrasound transmitters for transmitting ultrasound pulses and a single receiver to receive echoes of ultrasound pulses reflected from an obstacle.

Several alternative arrangements of the ultrasound transmitter and receiver arrays are shown in FIGS. 4 and 5. In FIG. 4 the series of ultrasound transmitters 22, 24, 26 and 28 are shown paired with receivers 222, 224, 226 and 228. The transmitters are directional, transmitting along a narrow cone or lobe, and the receivers are positioned to receive echoes only from their associated transmitters. In FIG. 5 the transmitters 22, 24, 26 and 28 are also directional but aimed to reflect an echo from an obstacle to a single receiver 232. Clearly in a paired arrangement like that of FIG. 4, the identification of the transmitter whose pulse is received as an echo is readily identified by identifying a receiver that receives that echo. In the arrangement of FIG. 5, on the other hand, another identification means is necessary to permit discrimination among the echoes as to which transmitter has been echoed. An alternative to the arrangement of FIG. 4, not separately illustrated, employs a single transducer to both transmit the ultrasound pulse and receive its echo at each transmitter location. Here timing of the pulse emission and receiving functions is important for proper operation and such timing can be accomplished with microcontroller programming as well.

Figure 6:
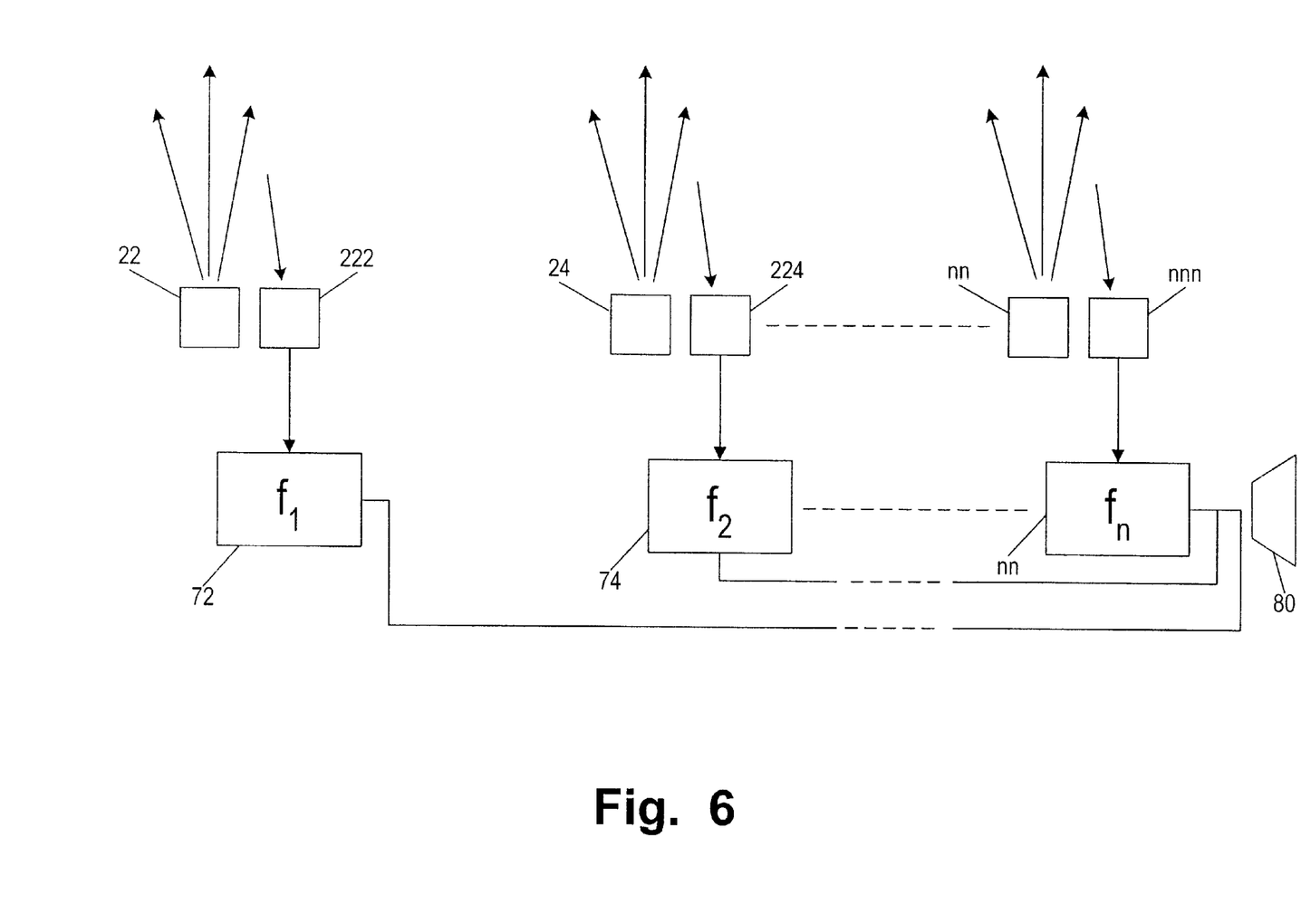
FIG. 6 is a schematic illustration of an array of ultrasound transmitters and receivers in association with tone generators for driving a speaker.

In FIG. 6 paired transmitters and receivers in an array of N pairs shown. Each of the receivers 222, 224, . . . nnn are connected to activate an individual oscillator 72, 74, . . . nn operating at frequencies $F_1, F_2, \ldots F_n$ to produce readily discernable tones of varying frequencies by the speaker 80. Alternatively, a single variable frequency tone generator may be employed and controlled in response to signals from the receivers 222, 224, . . . nnn to produce a characteristic frequency associated with each of the receivers. Omitted in FIGS. 6, 7 and 8 are routine amplification, power supply, signal handling and the like.

Figure 7:
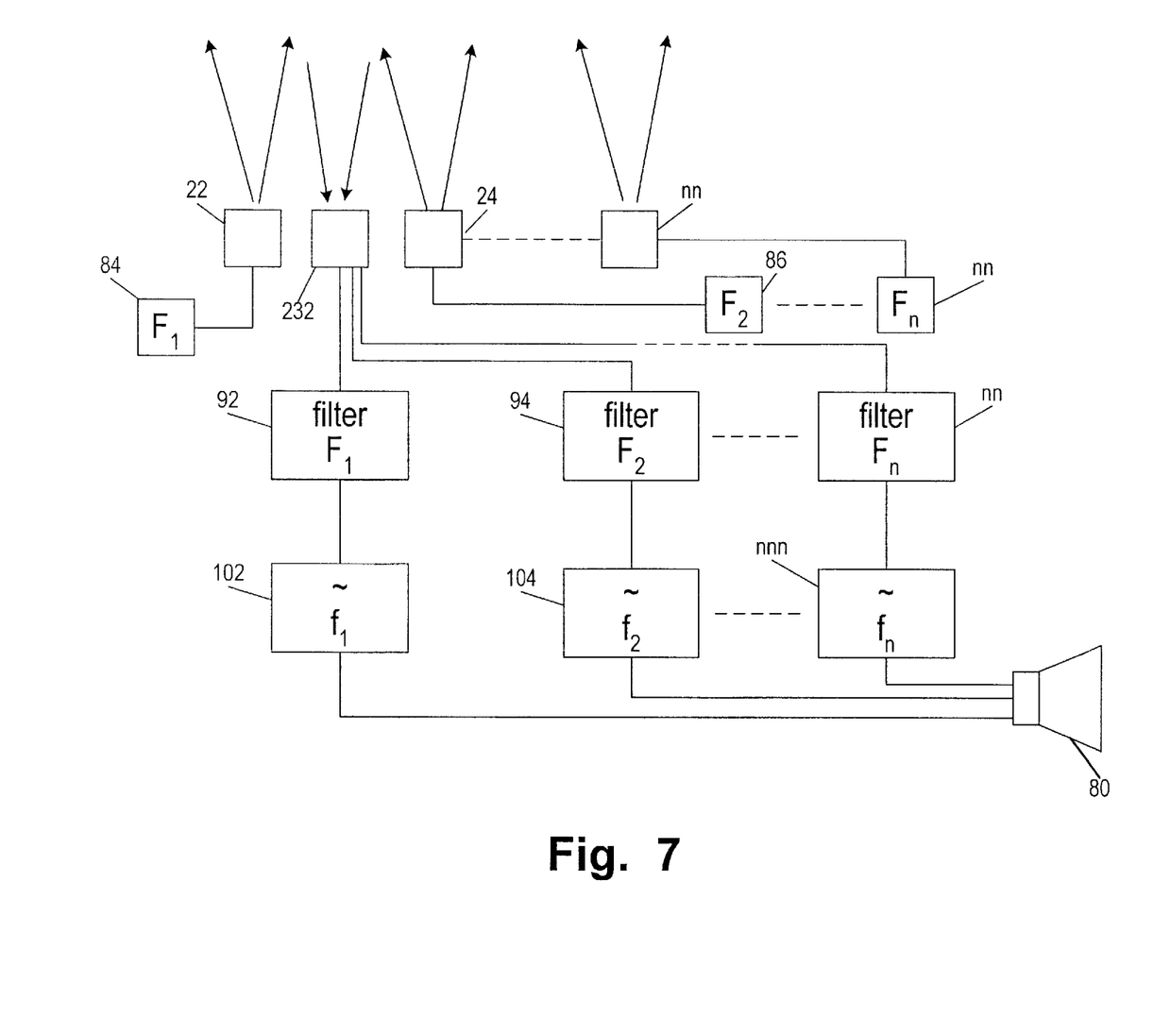
FIG. 7 is a schematic illustration of a further array of ultrasound transmitters and a single receiver, and shows filters and tone generators for discriminating among echoes of ultrasound pulses.

In FIG. 7 is shown schematically an array of transmitters 22, 24, . . . nn and a single detecting transducer or receiver 232. Here the transmitters 22, 24, . . . nn are driven at a frequency $F_1, F_2, \ldots F_n$ by oscillating and amplifying circuits 84, 86, . . . nn. Echoes received at the receiver 232 will be at the frequency of the ultrasound pulse originating from the transmitters 22, 24, . . . nn and so can be recognized through the use of filters 92, 94, . . . nn. Signals passed by the filters 92, 94, . . . nn are used to activate audible frequency oscillators or tone generators 102, 104, . . . nnn producing audible tones of distinctly different frequencies by the speaker 80.

Figure 8:
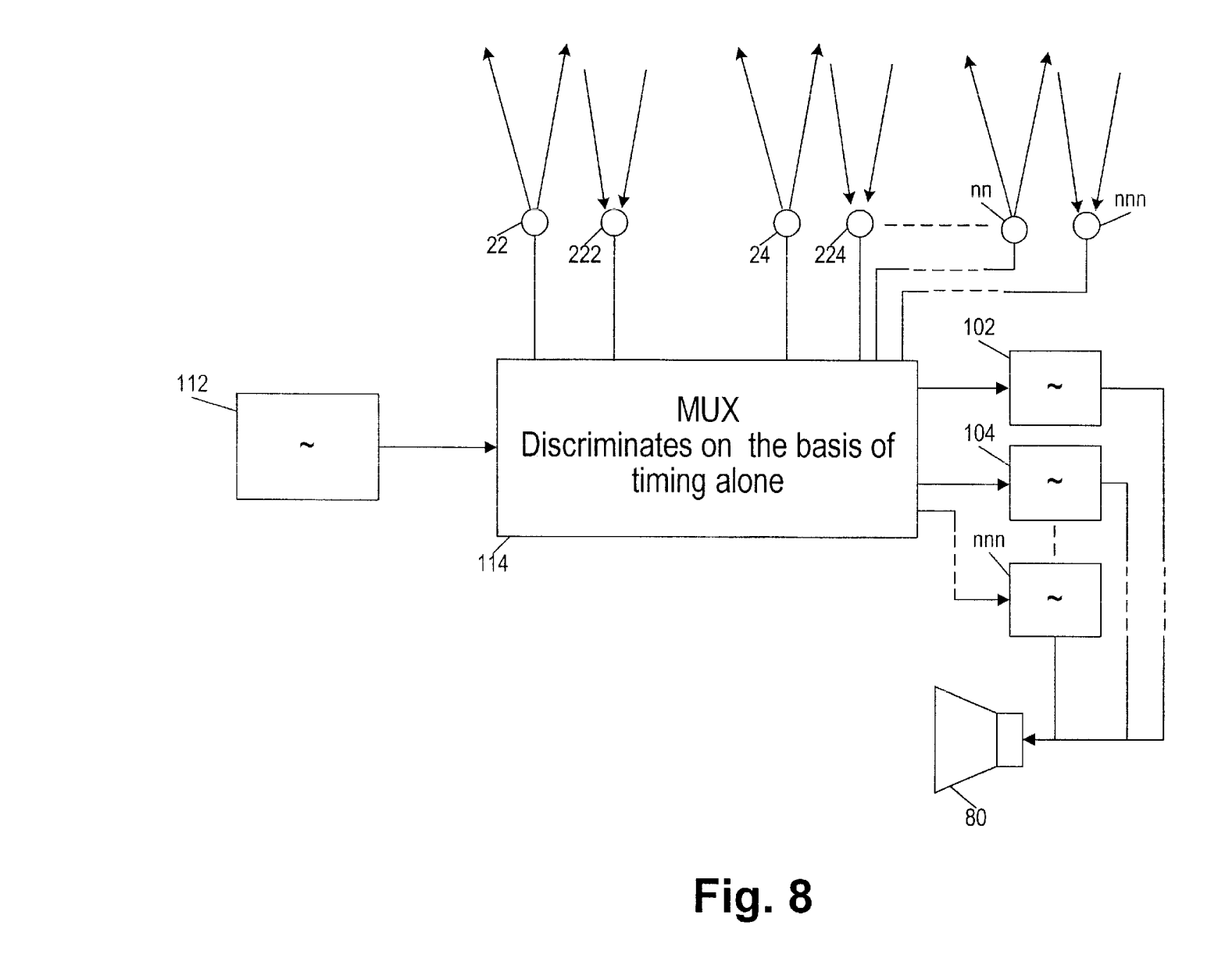
FIG. 8 is a schematic block diagram of an array of ultrasound transmitters and receivers in cooperation with a multiplexer for discriminating among received ultrasound echoes on the basis of timing.

FIG. 8 illustrates schematically an analog multiplexer used to discriminate among received echoes on the basis of timing alone. A clock 112 provides timing for the multiplexer 114 that determines the timing of emission of ultrasound pulses from the transmitters 22, 24, . . . nn. Likewise, the multiplexer sets the window of time during which each of the series of receivers 222, 224, . . . nnn may receive echoes to be assembled as electrical signals by the multiplexer and used to operate oscillators 102, 104, . . . nnn to produce readily discernable tones of different frequencies at the speaker 80.

Figure 8A:
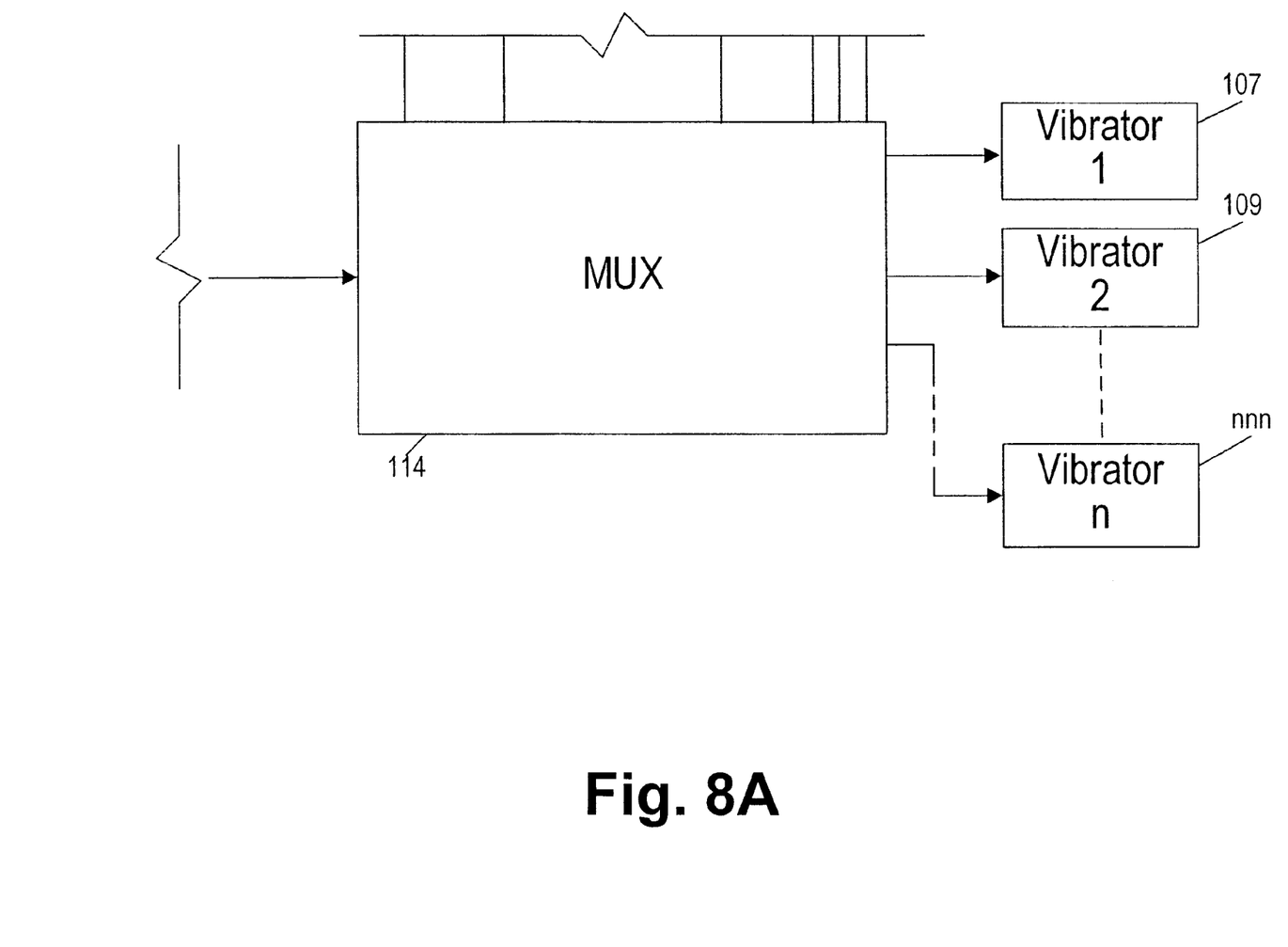
FIG. 8a is a partial schematic block diagram of the FIG. 8 arrangement modified to provide vibratory outputs.

FIG. 8a illustrates a modification to the system of FIG. 8 in which the outputs indicative of the received echoes are vibrations of vibrators 107, 109 . . . nnn.

Figure 9:
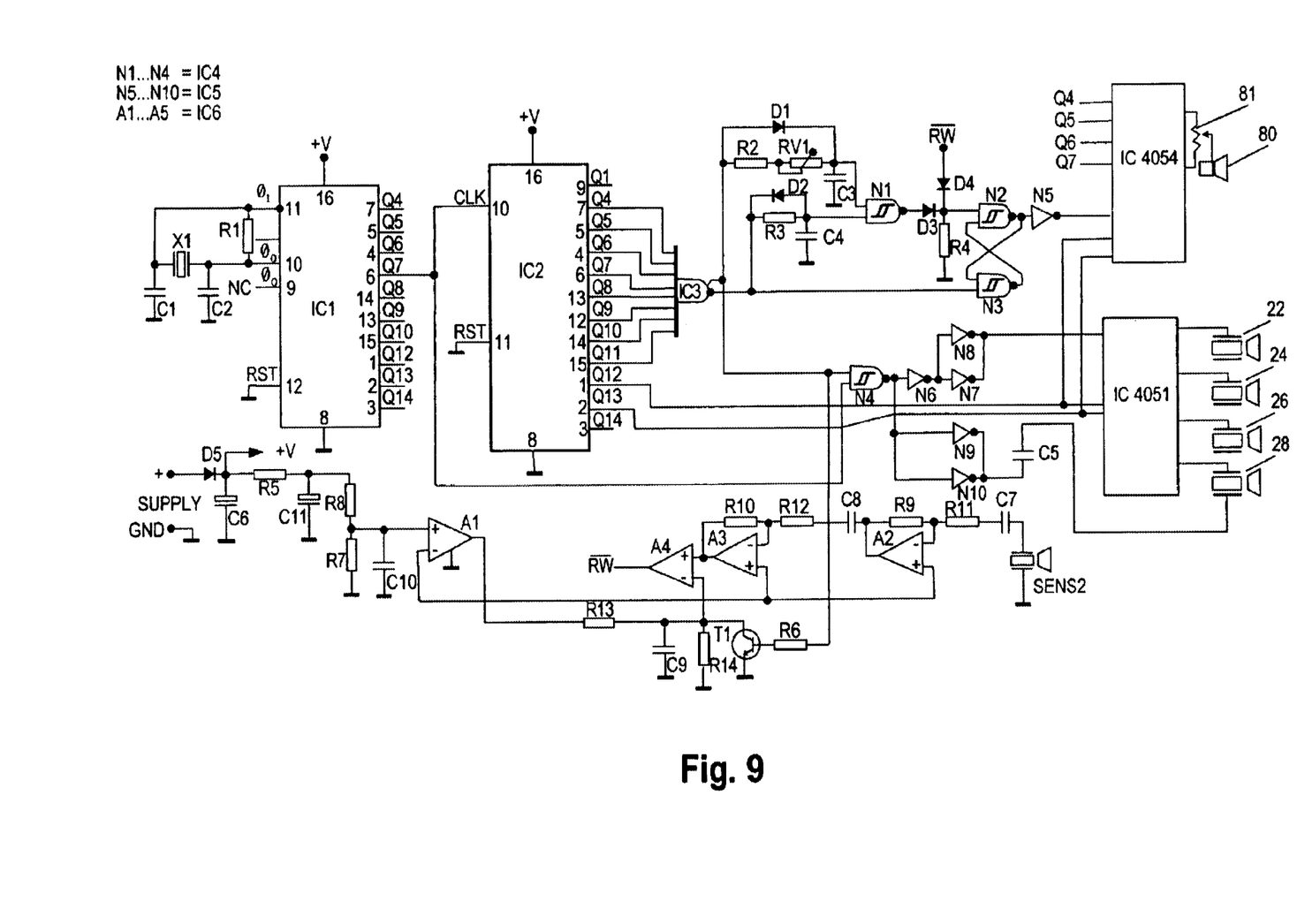
FIG. 9 is a schematic circuit diagram of a prototype of a path guidance system in accordance with the invention.

Shown in FIG. 9, the prototype path guidance system in accordance with the invention was developed using a Velleman parking system available from Radio Shack. The single ultrasound transmitter provided in that device was replaced by four such transmitters 22, 24, 26 and 28 and a circuit IC4051 which is an analog multiplexer controlled from pins P12 and P13 of IC2, a microcontroller. Similarly, the audible output employs a multiplexer IC4054 inputs from pins Q4, Q5, Q6 and Q7 of IC2 and address generation identical to IC4051 taken from pins Q12 and Q13 of the IC2. The approach is similar to the approach for the ultrasound outputs. Instead of a common input signal and four outputs, there are four inputs and a common output to the speaker 80.

For the purpose of this prototype the transmitter 22 directed 40 kHz pulses toward a location corresponding to the face of the individual. The left and right torso transmitters 24 and 26 directed 40 kHz pulses to locations forward of their positions on the person and the transmitter 28 directed forward of the user's lower torso or abdomen its 40 kHz pulses. The ultrasonic waves produce spread in a cone diverging at 2.5 degrees from the center line. This unit was built to detect obstacles at a maximum of 1.5 meters. At the maximum range, the wave spread to a diameter of 13 centimeters. The transmitter receiver pair had to be within 6.5 centimeters of each other for detection of an obstacle at the maximum distance. For closer obstacles, they needed to be closer. For a good range of detection, 0.45 meters (1.5 feet) to 1.5 meters (4.92 feet), the sensors should be within 2 centimeters of each other.

The sampling rate was 29 Hz divided among the four transmitters or approximately 7 Hz each. The multiplexer IC4051 controlled the dividing of the sampling rate and the sequencing. A higher sampling rate of about 20 Hz for each individual transmitter would, it is believed, be preferable and is implemented in the microcontroller-based unit of FIGS. 2 and 3. This multiplexer uses binary addressing to direct the signal to the addressed output. The range of the unit was appropriate because it extends just beyond the range of a cane. If it were too long, the user would react to obstacles too early and would have too much environmental input. This could become a major distraction for the user and could impair his or her ability to find obstacles with a cane.

The output is easy to understand. When the sensors detect an obstacle, a loud auditory chirp or beep sounds. As the distance between the obstacle and the sensors decrease, the chirps or beeps occur more frequently until they become a solid, continuous tone. The output is thus effective in communicating both the presence of and the distance to obstacles. Volume control was effected using a potentiometer 81 between the IC4054 and the speaker 80. It was found that the volume could be set sufficiently low that only the user could hear the tones from the speaker 80, whereas if set too loud it could attract unwanted attention and cause embarrassment.

The audible tone frequencies of 10,000 Hz, 5,000 Hz, 2,500 Hz and 1,250 Hz are taken from the circuit IC2 at the pins Q4, Q5, Q6 and Q7. The not-enable pin of IC4051 is connected through the circuit originally used in the parking application to drive an audible tone generator whenever an echo was received. Used in the fashion of FIG. 9, then, the output at N5 to the not-enable pin prevents audible tones being generated in the absence of an echo.

The foregoing descriptions of at least one preferred embodiment are exemplary and not intended to limit the claimed invention. Obvious modifications that do not depart from the spirit and scope of the invention as claimed will be apparent to those skilled in the art.

We claim:

1. Method of assisting a vision impaired person to recognize obstacles including
   (a) directing a first ultrasound pulse in a first direction from the person,
   (b) detecting an echo of the first ultrasound pulse to the person when an obstacle is located in the first direction,
   (c) directing a second ultrasound pulse in a second direction away from the person,
   (d) detecting an echo of the second ultrasound pulse to the person when an obstacle is located in the second direction,
   (e) generating an output tone of a first discernable characteristic upon receipt of the echo of the first ultrasound pulse, and
   (f) generating an output tone of a second discernable characteristic upon receipt of the echo of the second ultrasound pulse.

2. The method according to claim 1, wherein steps (e) and (f) comprise generating audible tones at first and second frequencies.

3. The method according to claim 1, wherein step (a) comprises directing a first ultrasound pulse having a first detectable characteristic, step (c) comprises directing a second ultrasound pulse having a second detectable characteristic, steps (b) and (d) comprise recognizing the echo as that of the first or second ultrasound pulse based upon said detectable characteristics in the echo.

4. The method according to claim 1, wherein step (a) comprises directing the first ultrasound pulse at a first time $T_1$, step (c) comprises directing the second ultrasound pulse at a second time $T_2$, step (b) comprises recognizing an echo of the first pulse when received by a first time window in which it is received at the person, and step (d) comprises recognizing an echo of the second pulse when received by a second time window in which it is received at the person.

5. The method according to claim 2, wherein generating audible tones at first and second frequencies includes providing a plurality of signal generators coupled to a speaker and having outputs at one of said first and second frequencies, activating one of the signal generators upon receipt of an echo of the first ultrasound pulse, and activating a second of the signal generators upon receipt of an echo of the second ultrasound pulse.

6. The method according to claim 1, wherein step (a) comprises directing a first ultrasound pulse of a first frequency, step (c) comprises directing a second ultrasound pulse of a second frequency, steps (b) and (d) comprise discriminating among echoes of the first and second ultrasound pulses based upon their having the first or second frequency.

7. The method according to claim 4, wherein steps (a) and (c) comprise directing the first and second ultrasound pulses as pulses in a series of ultrasound pulses emitted serially and spaced apart temporally and in differing directions away from the person, steps (b) and (d) comprise determining the time of receipt of any received ultrasound echo to determine which pulse in the series of ultrasound pulses produced the echo, and steps (e) and (f) comprise generating one of a series of output tones each with a discernable characteristic setting it apart from other of the series of output tones, whereby the location of an obstacle is determined by association by the person of the discernable characteristic with the direction away from the person in which the ultrasound pulse that produced an echo was directed.

8. The method according to claim 7, wherein the outputs are audible tones and the discernable non-visible characteristics are the frequencies of the tones.

9. The method according to claim 8, further comprising increasing the rapidity of repetition of the audible tones as distance to the obstacle from the person decreases.

10. The method according to claim 9, further comprising determining distance to the obstacle from the person based on elapsed time from directing an ultrasound pulse to receipt of its echo.

11. The method according to claim 8, wherein steps (a) and (c) comprise providing an array of at least three ultrasound transmitters to produce said first, second and at least a third ultrasound pulse away from the person in the first, second and at least a third direction.

12. The method according to claim 11, further comprising repeatedly, continually activating the at least three ultrasound transmitters to produce said first, second and third ultrasound pulses repeatedly and continuously in a temporally spaced progression of pulses.

13. An ultrasonic travel aid for the vision impaired person comprising:
   (a) a plurality of ultrasound transmitters, each operative to emit an ultrasound pulse,
   (b) at least one ultrasound receiver operative to receive an ultrasound pulse and to produce an electrical output, (c) a source of an exciting electrical signal, (d) a circuit directing the exciting electrical signal between the source of an exciting signal to each of the ultrasound transmitters, (e) at least one output transducer having a detectable audible output operatively coupled to the at least one ultrasound receiver, (f) a first of the transmitters being aimed to transmit ultrasonic pulses at objects at a first location with respect to a user of the travel aid, (g) a second of the transmitters being aimed to transmit ultrasound pulses at objects at a second location with respect to the user of the travel aid, (h) the at least one receiver being positioned to receive ultrasound pulses emitted by one of the transmitters and reflected by an object to the at least one receiver, and (i) the at least one ultrasound receiver and the at least one output transducer being responsive to reflected ultrasound pulses originating from one of the plurality of transmitters to produce a detectable audible output of a first discernable characteristic, and the at least one ultrasound receiver and the at least one output transducer being responsive to reflected ultrasound pulses originating from another of the plurality of transmitters to produce a detectable audible output of a second discernable characteristic, whereby the first and second discernable characteristics are indicative of the presence of a sound-reflecting object at the first and second locations, respectively.

14. The ultrasonic travel aid according to claim 13, wherein the output transducer comprises a speaker, the detectable audible output of a first discernable characteristic is an audible tone of a first frequency, and the detectable audible output of a second discernable characteristic is an audible tone of a second frequency.

15. The ultrasonic electronic travel aid according to claim 14, further comprising a first oscillator operatively coupled to the speaker and having an output at said first frequency, a first activating circuit operatively coupled between the at least one ultrasound receiver and the first oscillator for activating the first oscillator in response to a first electrical signal from the at least one ultrasound receiver, a second oscillator operatively coupled to the speaker and having an output at said second frequency, a second activating circuit operatively coupled between the at least one ultrasound receiver and the second oscillator for activating the second oscillator in response to a second electrical signal from the at least one ultrasound receiver.

16. The ultrasonic electronic travel aid according to claim 14, further comprising a timer operatively coupled to the source of exciting electrical signal and the ultrasound transmitters to cause activation of the ultrasound transmitters at timed intervals, said timer operatively coupled to the at least one ultrasound receiver, and at least one tone generator alternately driving the speaker at the first and second frequencies, the timer controlling the application of tones generated by the at least one tone generator at the first and second frequencies as a function of the time of detection of a reflected ultrasound pulse at the at least one receiver relative to the time of emission of an ultrasound pulse by one of the ultrasound transmitters.

17. An ultrasonic electronic travel aid for the vision impaired person comprising:

(a) at least three ultrasound transmitters, each comprising a piezoelectric ultrasound transmitter operative to emit an ultrasound pulse, (b) at least one piezoelectric ultrasound receiver operative to receive an ultrasound pulse to produce an electrical output, (c) a source of an exciting electrical signal operating at a pulse rate higher than 20 Hz, (d) an analog multiplexer connected between the source of an exciting signal and the piezoelectric ultrasound transmitters to divide the higher than 20 Hz pulse rate among the transmitters, (e) at least one speaker, (f) at least one speaker-exciting tone generator operatively connected between the speaker and the at least one receiver and responsive to an electrical output from the at least one receiver to produce a selected one of a 10 kHz, 5 kHz, 2,500 Hz or 1,250 Hz tone by the speaker, (g) a first of the transmitters being aimed to transmit ultrasonic pulses at objects generally corresponding to the height of and in front of a user's head, (h) a second of the transmitters being aimed to transmit ultrasound pulses at objects generally corresponding in height and in front of a first location on the user's torso, (i) the third transmitter being aimed to transmit ultrasound pulses at objects generally corresponding in height and in front of a second location on the user's torso, (j) the at least one receiver being positioned to receive ultrasound pulses emitted by one of the four transmitters and reflected by an object to the at least one receiver, and (k) the at least one speaker-exciting tone generator producing one of the 10 kHz, 5 kHz, 2,500 Hz and 1,250 Hz tones upon reflection to the at least one receiver of an ultrasound pulse emitted by the transmitter, the at least one speaker-exciting tone generator producing a second of the 10 kHz, 5 kHz, 2,500 Hz and 1,250 Hz tones upon reflection to the at least one receiver of an ultrasound pulse emitted by another of the transmitters, and the at least one speaker-exciting tone generator producing at least a third of the 10 kHz, 5 kHz, 2,500 Hz and 1,250 Hz tones upon reflection to the at least one receiver of an ultrasound pulse emitted by the third transmitter, whereby the frequency of the tone emitted by the speaker is indicative of the location of an object in a user's path to which one of the three transmitters is aimed.

18. The ultrasonic travel aid according to claim 17, comprising four of said ultrasound transmitters, and means for supporting the transmitters on the body of the user, the four transmitters having a relatively narrow pattern of transmission in directions forward of the user, a fourth of the four transmitters being aimed to transmit ultrasound pulses at objects generally corresponding in height and in front of a center location on the user's torso.

19. An ultrasonic travel aid for the vision-impaired person including:

(a) means for directing a first ultrasound pulse in a first direction from the user, (b) means for detecting an echo of the first ultrasound pulse to the person when an obstacle is located in the first direction, (c) means for directing a second ultrasound pulse in a second direction away from the person, (d) means for detecting an echo of the second ultrasound pulse to the person when an obstacle is located in the second direction, (e) means for generating an output tone of a first discernable characteristic upon receipt of the echo of the first ultrasound pulse, and (f) means for generating an output tone of a second discernable characteristic upon receipt of the echo of the second ultrasound pulse.

20. An ultrasonic travel aid according to claim 19, wherein the means for generating an output tone of a first discernable characteristic and the means for generating an output tone of a second discernable characteristic comprise means for generating audible tones at first and second frequencies.

21. An ultrasonic travel aid according to claim 19, wherein the means for directing a first ultrasound pulse comprises means for directing an ultrasound pulse of a first detectable characteristic, the means for directing a second ultrasound pulse comprising means for directing an ultrasonic pulse of a second discernable characteristic, and both said means for detecting an echo comprise means for recognizing the echo as that of the first or second ultrasound pulse based upon said detectable characteristics in the echo.

22. The ultrasonic travel aid according to claim 19, wherein the means for directing a first ultrasound pulse comprises means for directing the first ultrasound pulse at a first time $T_1$, the mean for directing a second ultrasound pulse comprises means for directing the second ultrasound pulse at a second time $T_2$, the means for detecting an echo of the first ultrasound pulse comprises means for recognizing an echo of the first pulse when received by a first time window in which it is received at the person, and the means for detecting an echo of the second ultrasound pulse comprises means for recognizing an echo of the second pulse when received by a second time window in which it is received at the person.

23. The ultrasonic travel aid according to claim 20, wherein the means for generating audible tones at first and second frequencies includes a plurality of signal generators coupled to a speaker and having outputs at one of said first and second frequencies, and means for activating one of the signal generators upon receipt of an echo of the first ultrasound pulse and for activating a second of the signal generators upon receipt of an echo of the second ultrasound pulse.

24. The ultrasonic travel aid according to claim 19, wherein the means for directing a first ultrasound pulse comprises means for directing a first ultrasound pulse of a first frequency, the means for directing a second ultrasound pulse comprises means for directing a second ultrasound pulse of a second frequency, both of the means for detecting an echo comprise means for discriminating among echoes of the first and second ultrasound pulses based upon their having the first or second frequency.

25. The ultrasonic travel aid according to claim 19, wherein both means for directing ultrasound pulses comprise means for directing the first and second ultrasound pulses as pulses in a series of ultrasound pulses emitted serially and spaced apart temporally and in different directions away from the person, the system further comprises means for determining the time of receipt of any received ultrasound echo to determine which pulse in the series of ultrasound pulses produced the echo, and both means for generating an output tone comprise means for generating one of a series of output tones each with a discernable characteristic setting it apart from other of the series of output tones, whereby the location of an obstacle is determined by association by the person of the discernable characteristic with the direction away from the person in which the ultrasound pulse that produced an echo was directed.

26. The ultrasonic travel aid according to claim 25, wherein the outputs are audible tones and the discernable characteristics are the frequencies of the tones.

27. The ultrasonic travel aid according to claim 26, further comprising means for increasing the rapidity of repetition of the audible tones as distance to the obstacle from the person decreases.

28. The ultrasonic travel aid according to claim 27, further comprising means for determining distance to the obstacle from the person based on elapsed time from directing an ultrasound pulse to receipt of its echo.

29. The ultrasonic travel aid according to claim 26, wherein both means for directing form part of an array of at least three ultrasound transmitters to produce said first, second and at least a third ultrasound pulse away from the person in the first, second and at least a third direction.

30. The ultrasonic travel aid according to claim 29, further comprising means for repeatedly, continually activating the at least three ultrasound transmitters to produce said first, second and third ultrasound pulses repeatedly and continuously in a temporally spaced progression of pulses.

31. An ultrasonic travel aid for the vision impaired person comprising:
(a) a plurality of ultrasound transmitters, each operative to emit an ultrasound pulse,
(b) at least one ultrasound receiver operative to receive an ultrasound pulse and to produce an electrical output,
(c) a source of an exciting electrical signal,
(d) a circuit directing the exciting electrical signal between the source of an exciting signal to each of the ultrasound transmitters,
(e) at least one output transducer having a detectable audible vibratory output operatively coupled to the at least one ultrasound receiver,
(f) a first of the transmitters being aimed to transmit ultrasonic pulses at objects at a first location with respect to a user of the travel aid,
(g) a second of the transmitters being aimed to transmit ultrasound pulses at objects at a second location with respect to the user of the travel aid,
(h) the at least one receiver being positioned to receive ultrasound pulses emitted by one of the transmitters and reflected by an object to the at least one receiver, and
(i) the at least one ultrasound receiver and the at least one output transducer being responsive to reflected ultrasound pulses originating from one of the plurality of transmitters to produce a detectable vibratory audible output of a first discernable characteristic of vibration, and the at least one ultrasound receiver and the at least one output transducer being responsive to reflected ultrasound pulses originating from another of the plurality of transmitters to produce a detectable vibratory output of a second discernable characteristic of vibration, whereby the first and second discernable characteristics are indicative of the location of a sound-reflecting object.

32. The ultrasonic travel aid according to claim 31, wherein the output first and second discernable characteristics of vibration are indicative of the nearness of a detected obstacle.

33. The ultrasonic travel aid of claim 32, wherein the first and second discernable characteristics of vibration are frequency of vibration that changes with distance to an object.

34. The ultrasonic travel aid of claim 32, wherein the first and second discernable characteristics of vibration are times between pulses of vibration that change with distance to an object.

* * * * *